UNITED STATES PATENT OFFICE 2,512,732

CARBAMIC ACID ESTERS OF (3-HYDROXY-2-PYRIDYLMETHYL)AMINES AND SALTS THEREOF

John A. Aeschlimann, Montclair, N. J., and Arthur Stempel, Brooklyn, N. Y., assignors to Hoffmann-La Roche Inc., Nutley, N. J., a corporation of New Jersey No Drawing. Application May 14, 1948, Serial No. 27,154

16 Claims. (Cl. 260—296)

The present invention relates to the synthesis of carbamic acid esters of (3-hydroxy-2-pyridylmethyl)amines and also to new intermediates which can be employed in the preparation of the aforesaid compounds.

The new carbamic acid esters of (3-hydroxy-2-pyridylmethyl)amines, in their basic form, can be represented by the following formula:

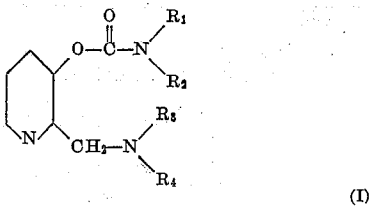

(I)

The intermediates which are (3-hydroxy-2-pyridylmethyl)amines can, in their basic form, be represented by the following formula:

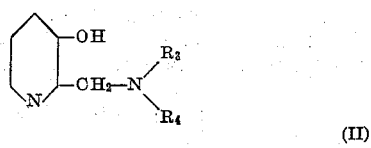

(II)

The invention also includes the salts of the compounds of Formulae I and II with organic or inorganic acids, as well as the quaternary ammonium salts thereof. In the above formulae, $R_1$ and $R_2$ stand for hydrogen, alkyl, aralkyl, aryl and substituted aryl radicals; $R_3$ and $R_4$ stand for hydrogen, alkyl, dialkylamino-alkyl, aryl, aralkyl radicals, or jointly with N, form a saturated heterocyclic ring, such as a piperidine or morpholine ring.

The compounds of Formula I can be prepared in general by reacting together 3-hydroxy-pyridine with secondary amines or their salts in the presence of formaldehyde or a formaldehyde-yielding compound such as formalin, trioxymethylene, formaldehyde bisulfite and the like, and treating the reaction product which is a (3-hydroxy-2-pyridylmethyl)amine of Formula II with a carbamyl halide such as a tertiary carbamyl chloride, bromide or the like, which can be represented by the following formula:

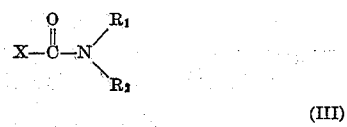

(III)

where X=halogen, and $R_1$ and $R_2$ have the same significance as already assigned thereto.

In an alternative procedure, the (3-hydroxy-2-pyridylmethyl)amines can be treated with phosgene, whereby the corresponding chloro-formic acid esters of the (3-hydroxy-2-pyridylmethyl)-amines are formed and these then reacted with ammonia or an amine to form the desired compounds of Formula I. The amines employed can be represented by the following formula:

(IV)

where $R_1$ and $R_2$ have the same significance already assigned thereto.

According to another procedure the (3-hydroxy-2-pyridylmethyl)amines can be reacted with an isocyanate, as for example, phenyl isocyanate, methyl isocyanate, and the like to form the compounds of Formula I where one of $R_1$ and $R_2$ is hydrogen.

The compounds of Formulae I and II may also be prepared by reacting a 2-halogenomethyl-3-hydroxy-pyridine or the carbamic esters thereof with an amine of Formula IV.

Where one or both of the radicals $R_3$ and $R_4$ in compounds of Formulae I and II represent benzyl or substituted benzyl, by catalytic hydrogenation one or both of the radicals can be replaced by hydrogen with formation of the corresponding secondary and primary amines.

The proportion of the reagents employed to form the compounds of Formulae I and II may be varied within wide limits and are not critical. In general, however, the reagents are employed in equimolecular ratios. In practice, approximately one mol of the tertiary carbamyl halide of Formula III to one mol of the (3-hydroxy-2-pyridylmethyl)amine of Formula II are employed in the reaction.

While the compounds of Formula I and Formula II are obtained in the form of tertiary amines, it is preferable to convert the bases into a salt, as for example, the acid addition salts, for instance the hydrochloride or dihydrochloride, picrate, tartrate, salicylate; or the quaternary ammonium salts, as by treating with methyl sulfate, methyl toluene sulfonate, methyl iodide, or methyl bromide and similar quaternizing reagents.

The new carbamic esters of Formula I are characterized by their pharmacological activity, being effective inhibitors of cholinesterase and having an anticurare action. This activity of the new compounds is surprising since they are not carbamyl esters of phenols as are physostigmine and neostigmine, but are esters of hydroxypyridine.

Some of the compounds, or intermediates, also exhibit an antihistamine activity. The compounds are also useful in other ways.

The following examples will serve to illustrate the methods for carrying out the invention and for producing our new compounds:

EXAMPLE 1

*(3-hydroxy-2-pyridylmethyl) dimethylamine*

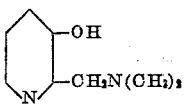

To a solution of 41 grams of 3-hydroxypyridine in 65 cc. of water and 67 cc. of dimethylamine solution (19.5 grams of dimethylamine) were added 36 cc. of a formalin solution containing 13 grams of formaldehyde. The solution was then heated on the steam bath for two hours. The solvent was removed by distillation in vacuo and the residue distilled. The fraction boiling at 117–122° C./10 mm. was collected. It was a yellow oil that crystallized on standing. The compound was purified by sublimation in vacuo at 60° C. and 0.3 mm. M. P. 56–59° C.

It reacted almost immediately with methyl bromide in acetone to give (3-hydroxy-2-pyridylmethyl) trimethyl ammonium bromide. After recrystallization from a mixture of ethanol and ether, the compound melted at 175–177° C. with decomposition.

To a solution of (3-hydroxy-2-pyridylmethyl)-dimethylamine in alcohol, alcoholic hydrochloric acid was added. A dihydrochloride precipitated which was recrystallized from ethanol. M. P. 178–186° C. with decomposition.

Following the same procedure as in Example 1, (3-hydroxy-2-pyridylmethyl) diethylamine was prepared from 3-hydroxypyridine, diethylamine, and formaldehyde. It was a yellow oil boiling at 90° C./2.7 mm.–110° C./3.7 mm.

EXAMPLE 2

*Dimethylcarbamate of (3-hydroxy-2-pyridylmethyl) trimethyl ammonium bromide*

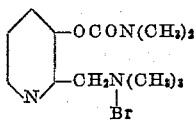

A solution of 43 grams of (3-hydroxy-2-pyridylmethyl) dimethylamine in 30 cc. of pyridine and 32 cc. of dimethylcarbamyl chloride was heated on a steam bath for two hours. Most of the pyridine was then removed by distillation in vacuo. The residue was dissolved in cold water, made alkaline with sodium hydroxide, and extracted with ether. The ether layer was washed with water and then dried over sodium sulfate. The ether was distilled off and the traces of pyridine removed by heating on a steam bath under a vacuum of less than 1 mm. The residue was then dissolved in an acetone solution of methyl bromide and crystals of the quaternary salt separated in a very short time. After recrystallization from a mixture of ethanol and ether, the product melted at 175–177° C. with decomposition.

The compound was heated in a methanol solution of methyl bromide at 70° C. for about 16 hours. On addition of ether a crystalline product separated which on recrystallization from methanol-ether had a M. P. 151–153° C., with decomposition. It was the dimethyl carbamate of 1-methyl-3-hydroxy-2-trimethyl ammonium methyl pyridinium dibromide of the formula:

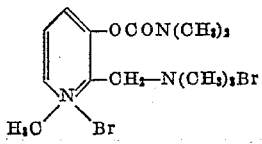

Following the same procedure as in the first paragraph of Example 2, there can be obtained the following compounds from:

1. p-Bromophenyl-methyl carbamyl chloride instead of dimethylcarbamyl chloride,

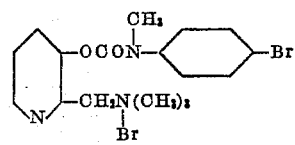

[p-Bromophenylmethylcarbamate of (3-hydroxy - 2 - pyridylmethyl) trimethyl ammonium bromide, M. P. 176–178° C.]

2. p-Tolylmethyl carbamyl chloride instead of dimethylcarbamyl chloride,

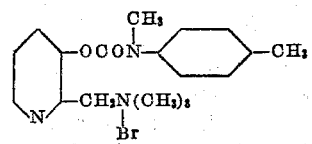

[p-Tolylmethylcarbamate of (3-hydroxy-2-pyridylmethyl) trimethyl ammonium bromide, M. P. 153–155° C.]

3. Diisopropylcarbamyl chloride instead of dimethylcarbamyl chloride,

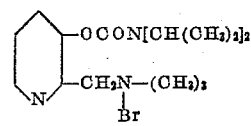

[Diisopropylcarbamate of (3 - hydroxy - 2 - pyridylmethyl) trimethyl ammonium bromide, M. P. 173–175° C.]

4. From (3 - hydroxy - 2 - pyridylmethyl) diethylamine instead of (3-hydroxy-2-pyridylmethyl) dimethylamine in Example 2,

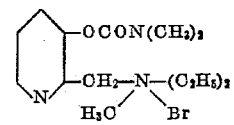

[Dimethylcarbamate of (3 - hydroxy - 2 - pyridylmethyl) diethylmethyl ammonium bromide, M. P. 141–143° C.]

EXAMPLE 3

*Dimethylcarbamate of (3-hydroxy-2-pyridylmethyl) dimethylamine monohydrochloride*

To a solution of 5 grams of (3-hydroxy-2-pyridylmethyl) dimethylamine in 25 cc. of dry benzene were added 4 cc. of dimethylcarbamyl chloride. Within one hour, at 25° C., an oil began to separate. After sixteen hours, the solvent was removed in vacuo and the residue crystallized. After recrystallization from a mixture of isopropanol and ether, the product melted at 128–130° C.

Other inert solvents, such as dioxane and ethylene dichloride can also be employed.

EXAMPLE 4

*Dimethylcarbamate of (3-hydroxy-2-pyridylmethyl) dimethylamine dihydrochloride*

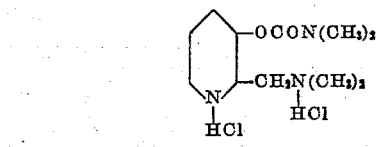

The esterification product obtained in the same manner as in Example 2 after removal of pyridine in vacuo, was dissolved in anhydrous ether and the solution saturated with hydrogen chloride. A light brown crystalline solid separated. This was dissolved in hot ethanol, decolorized with activated charcoal, and on addition of ether, the dihydrochloride crystallized. After recrystallization from a mixture of ethanol and ether, it melted at 163–167° C.

EXAMPLE 5

*Dimethylcarbamate of (3-hydroxy-2-pyridylmethyl) diethylamine dihydrochloride*

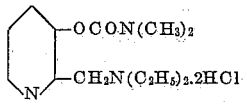

To a solution of 14 grams of (3-hydroxy-2-pyridylmethyl) diethylamine in 15 cc. of pyridine, 10 cc. of dimethylcarbamyl chloride were added. The solution became warm in a few minutes and was cooled in running water. It was then kept for about 16 hours at room temperature. Most of the pyridine was then removed by distillation in vacuo. The residue was then taken up in water, made alkaline with sodium hydroxide and extracted with ether. The ether was washed with salt water and dried over sodium sulfate. After removal of the ether by distillation, the last traces of pyridine were removed at about 90° C. and 0.1 mm. The residue was dissolved in an isopropanol solution containing anhydrous hydrogen chloride and most of the isopropanol then removed in vacuo. On addition of ether, an oil precipitated. This was dissolved in isopropanol and ether added to turbidity. On seeding, the product crystallized. After recrystallization from a mixture of isopropanol and ether, the product melted at 117–119° C.

EXAMPLE 6

*Phenylmethylcarbamate of (3-hydroxy-2-pyridylmethyl) diethylamine hydrochloride*

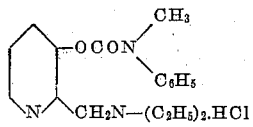

To a solution of 10 grams of (3-hydroxy-2-pyridylmethyl) diethylamine in 10 cc. of dry pyridine, there were added 10 grams of phenylmethylcarbamyl chloride. In about two minutes, the acid chloride dissolved with considerable evolution of heat and bubbling. The solution was cooled in water and kept for about sixteen hours at about 25° C. The large crystals which formed were filtered and washed with pyridine and anhydrous ether. After recrystallization from isopropanol and ether, the product of the above formula melted at 142–144° C.

EXAMPLE 7

*(3-hydroxy-2-pyridylmethyl) di-n-butylamine*

To a solution of 15 grams of 3-hydroxypyridine and 20.4 grams of di-n-butylamine in 100 cc. of 50 per cent ethanol, there were added 15 cc. of a 35 per cent formaldehyde solution. The mixture became turbid. After refluxing for 2 hours, an oil separated. The solvent was then removed in vacuo and the residue dissolved in ether. After washing with water and drying with sodium sulfate, the ether was distilled and the residue fractionally distilled. The product was a mobile light yellow oil distilling at 110–120° C./1.3 mm.

EXAMPLE 8

*Dimethylcarbamate of (3 - hydroxy - 2 - pyridylmethyl) methyl-di-n-butylammonium bromide*

A solution of 14 grams of (3-hydroxy-2-pyridylmethyl) di-n-butylamine and 10 cc. of dimethylcarbamyl chloride in 15 cc. of pyridine was kept at room temperature for about sixteen hours. Most of the pyridine was then removed by vacuum distillation. The residue was dissolved in water and the solution made alkaline with sodium hydroxide. An oil separated which was extracted with ether. The ethereal solution was washed with salt water, dried over $Na_2SO_4$ and the ether then removed by distillation. The residue was then heated at 100° C. under vacuum to remove traces of pyridine. It was then dissolved in an acetone solution of methyl bromide. On standing for about sixteen hours at about 4° C., crystals separated. The product was recrystallized from a mixture of isopropanol and ether, M. P. 154–155° C.

EXAMPLE 9

*(3-hydroxy-2-pyridylmethyl) methyl benzylamine*

To a solution of 15 grams of 3-hydroxypyridine and 19 grams of N-methyl-benzylamine in 100 cc. of 70 per cent ethanol, 15 cc. of 35 per cent formaldehyde solution were added slowly. After refluxing for two hours, the solvent was removed in vacuo. The residue was dissolved in ether, washed with water and dried over sodium sulfate. After removal of the ether, the residue was distilled in vacuo. The product boiled at 126–135° C./1.3 mm.

EXAMPLE 10

*Dimethylcarbamate of (3 - hydroxy - 2 - pyridylmethyl) benzyl methylamine dihydrochloride*

To a solution of 18 grams of (3-hydroxy-2-pyridylmethyl) benzyl methylamine in 20 cc. of pyridine were added 10 cc. of dimethylcarbamyl chloride. The solution became hot and was cooled in water. After standing for about sixteen hours at room temperature, pyridine was distilled off in vacuo. The residue was dissolved in water and made alkaline with sodium hydroxide. An oily layer separated which was extracted with ether. After washing the ether layer with water and drying over sodium sulfate, the solvent was distilled off. Traces of pyridine were removed under vacuum at 100° C. The residue was dissolved in anhydrous ether and dry hydrogen chloride passed through the solution. An amorphous precipitate formed which was filtered and dried in vacuo over potassium hydroxide flakes. The material was obtained crystalline from isopropanol. On recrystallization from ethanol and ether, it melted at 167–169° C.

EXAMPLE 11

*Dimethylcarbamate of (3-hydroxy-2-pyridylmethyl) methylamine dihydrochloride*

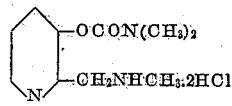

To a suspension of 1 gram of 5 per cent palladium chloride on charcoal in 80 cc. of methanol which had been prehydrogenated were added 1.55 grams of the compound produced in Example 10. The mixture was shaken with hydrogen at room temperature and atmospheric pressure. The calculated amount of hydrogen was taken up in about 140 minutes. The solution was filtered from the catalyst and reduced to a small volume in vacuo. Anhydrous ether was added to turbidity and a seed added. The product was recrystallized from a mixture of methanol and ether. M. P. 140–141° C.

EXAMPLE 12

*Dimethylcarbamate of (3 - hydroxy - 2 - pyridylmethyl) benzyldimethylammonium bromide*

The compound obtained as in Example 10 was neutralized with sodium carbonate and the free base extracted with benzene. The benzene was distilled in vacuo and the residue dissolved in an acetone solution of methyl bromide. In a short time, the product began to crystallize. After recrystallization from a mixture of ethanol and ether, it melted at 177–179° C. with decomposition.

EXAMPLE 13

*N-(3-hydroxy-2-pyridylmethyl) piperidine*

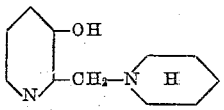

To a solution of 15 grams of 3-hydroxypyridine and 13.5 grams of piperidine in 50 cc. of water were added slowly 15 cc. of 35 per cent formaldehyde solution. The mixture was refluxed for two hours when the solvent was removed in vacuo. The residue was dissolved in ether and washed with water. After drying, the ether was removed by distillation. On distillation of the residue, N - (3 - hydroxy - 2 - pyridylmethyl)piperidine was isolated as an oil boiling at 95–97° C./0.8 mm.

EXAMPLE 14

*Dimethylcarbamate of N-(3-hydroxy-2-pyridylmethyl) piperidine dihydrochloride*

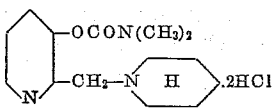

To a solution of 9 grams of N-(3-hydroxy-2-pyridylmethyl)piperidine in 20 cc. of pyridine were added 12 cc. of dimethylcarbamyl chloride. Within several minutes, the reaction mixture became warm. After cooling, the flask was kept for about sixteen hours at room temperature. Most of the pyridine was then removed by distillation in vacuo. The residue was dissolved in water, made alkaline with cold sodium hydroxide solution and the oil that separated extracted with ether. After washing the ether solution with water, it was dried and the ether removed by distillation. The last traces of pyridine were removed at 100° C. The residue, which is the free base, was dissolved in anhydrous ether and dry hydrogen chloride bubbled through. The hydrochloride was first crystallized from a mixture of isopropanol and ether, decolorizing with activated charcoal and then from a mixture of ethanol and ether. The dihydrochloride crystallizes as a solvate melting at 111–112.5° C.

*Example 15*

*Dimethylcarbamate of N-(3-hydroxy-2-pyridylmethyl)-N-methyl piperidinium bromide*

The dimethylcarbamate of N-(3-hydroxy-2-pyridylmethyl) piperidine obtained as in Example 14 was dissolved in a solution of methyl bromide in acetone. Within several hours, the quaternary salt crystallized. After recrystallization from a mixture of ethanol and ether, it was obtained as a hydrate melting at 156–157° C. with decomposition.

*Example 16*

*N,N-diethyl-N'-phenyl-N'-(3-hydroxy-2-pyridylmethyl) ethylene diamine hydrochloride*

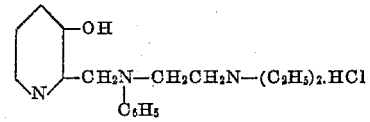

To a solution of 15 grams of 3-hydroxypyridine and 30 grams of N-phenyl-N',N'-diethylethylene diamine in 100 cc. of 70 per cent ethanol were added 13.5 cc. of a 35 per cent solution of formaldehyde. A small amount of heat was evolved. The mixture was refluxed for two hours and the solvent then removed in vacuo. The viscous residue was dissolved in 10 per cent sodium hydroxide and an insoluble material extracted with ether. On neutralization of the aqueous layer with dilute hydrochloric acid to about pH 8, a crystalline product separated. After recrystallization from water, it melted at 199–200° C. with decomposition. It exhibited antihistamine activity.

The free base prepared by treating with sodium carbonate 5 grams of the hydrochloride obtained above was dissolved in 150 cc. of anhydrous ether and 25 cc. of 0.7 N diazomethane in ether added. After standing for 96 hours at room temperature, an oily product had separated on the walls of the flask. The ether solution was poured off and solvent removed by distillation. The residue, insoluble in water and sodium hydroxide and soluble in hydrochloric acid, was suspended in dilute sodium hydroxide and extracted with ether. After drying, the ether layer was taken to dryness and the residue dissolved in dilute hydrochloric acid. On neutralization with dilute sodium carbonate, a crystalline precipitate formed. After recrystallization from water, a compound which melted at 72–74° C. was obtained. The compound shows an antihistamine activity and can be represented by the following formula:

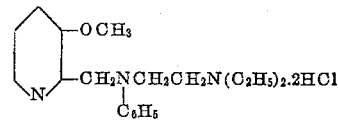

(N,N-diethyl-N'-phenyl - N'-(3 - methoxy-2-pyridylmethyl) ethylene diamine dihydrochloride.)

*Example 17*

*Dimethylcarbamate of N,N-diethyl-N-{2-[N'-(3-hydroxy-2-pyridylmethyl) - N' - phenylamino] ethyl}-N-methylammonium bromide*

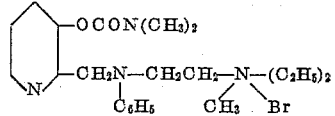

The dimethylcarbamate of N,N-diethyl-N'-phenyl-N'-(3-hydroxy-2-pyridylmethyl) - ethylene diamine prepared by reacting the free base described in Example 16 with dimethyl carbamyl chloride was dissolved in an acetone solution of methyl bromide. After several hours, crystals of the quaternary salt formed. After recrystallization from a mixture of methanol and ether, the product melted at 172–173.5° C. with decomposition.

Example 18

*N,N-diethyl-N'-benzyl-N'-(3-hydroxy-2-pyridylmethyl)-ethylene diamine dihydrochloride*

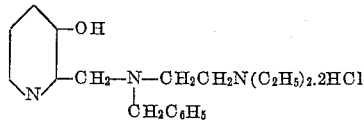

To a solution of 15 grams of 3-hydroxypyridine and 32.5 grams of N,N-diethyl-N'-benzylethylenediamine in 130 cc. of 75 per cent ethanol were added 15 cc. of a 35 per cent formaldehyde solution. After refluxing for two hours, the solvent was removed in vacuo. The residue was dissolved in dilute sodium hydroxide and extracted with ether. The alkaline solution was made slightly acid with dilute hydrochloric acid and then neutralized with sodium carbonate. An oil separated which was extracted with ether. After washing with water, the ether layer was dried over sodium sulfate, and the ether removed by distillation. The oily residue weighed 18 grams. It was dissolved in anhydrous ether and the dihydrochloride formed by bubbling dry hydrogen chloride through the solution. The product was recrystallized from isopropanol. M. P. 180–181° C.

EXAMPLE 19

*Phenylcarbamate of (3-hydroxy-2-pyridylmethyl) dimethylamine*

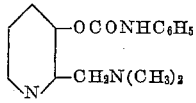

To a solution of 5 grams of (3-hydroxy-2-pyridylmethyl) dimethylamine in 15 cc. of benzene were added 8 cc. of phenyl isocyanate. Considerable heat was evolved and a crystalline solid formed within several minutes. The mixture set to a solid. After sixteen hours at 25° C.; the solid was triturated with petroleum ether and filtered. After several recrystallizations from petroleum ether (B. P. 85–100° C.) to remove impurities, the product melted at 91.5–94.5° C. Impurities may also be removed by dissolving the product in ethanol in which it is readily soluble and in which the impurities have low solubility. Salts may be prepared from the product in the usual manner.

We claim:

1. Compounds selected from the group consisting of the carbamic acid esters of (3-hydroxy-2-pyridylmethyl) amines and the salts thereof.

2. Compounds selected from the group consisting of the dialkyl carbamates of (3-hydroxy-2-pyridylmethyl) dialkylamines and the salts thereof.

3. Compounds selected from the group consisting of the dimethylcarbamate of (3-hydroxy-2-pyridylmethyl) dimethylamine and the salts thereof.

4. Dimethylcarbamate of (3-hydroxy-2-pyridylmethyl) dimethylamine dihydrochloride.

5. Compounds selected from the group consisting of the dimethylcarbamate of (3-hydroxy-2-pyridylmethyl) diethylamine and the salts thereof.

6. Dimethylcarbamate of (3-hydroxy-2-pyridylmethyl) diethylamine dihydrochloride.

7. Dimethylcarbamate of (3-hydroxy-2-pyridylmethyl) methyl-di-n-butylammonium bromide.

8. A method which comprises reacting 3-hydroxy-pyridine with formaldehyde in the presence of a secondary amine to form a (3-hydroxy-2-pyridylmethyl) amine and reacting the last mentioned compound with a member of the group consisting of a carbamic acid halide and an isocyanate to form the corresponding carbamic ester of the (3-hydroxy-2-pyridylmethyl) amine.

9. A process which comprises reacting a (3-hydroxy-2-pyridylmethyl) amine with a carbamic acid halide to form the corresponding carbamic ester of the (3-hydroxy-2-pyridylmethyl) amine.

10. A process which comprises reacting 3-hydroxy-pyridine with dialkylamine and formaldehyde and reacting the (3-hydroxy-2-pyridylmethyl) dialkylamine formed with an N-dialkyl carbamyl halide, so as to form an N-dialkyl carbamic acid ester of (3-hydroxy-2-pyridylmethyl dialkylamine.

11. A process which comprises reacting 3-hydroxy-pyridine with dimethylamine and formaldehyde and reacting the resulting reaction product with dimethylcarbamyl chloride to form the dimethylcarbamate of (3-hydroxy-2-pyridylmethylamine.

12. The process as in claim 11 wherein the dimethylcarbamate formed is treated with hydrogen chloride to form the dihydrochloride salt thereof.

13. A process which comprises reacting (3-hydroxy-2-pyridylmethyl)-diethylamine with dimethylcarbamyl chloride to form the dimethylcarbamate of (3-hydroxy-2-pyridylmethyl) diethylamine.

14. The process as in claim 13 wherein the dimethylcarbamate formed is treated with hydrogen chloride to form the dihydrochloride salt thereof.

15. A process which comprises reacting (3-hydroxy-2-pyridylmethyl) di-n-butylamine with dimethylcarbamyl chloride to form the dimethylcarbamate of (3-hydroxy-2-pyridylmethyl) di-n-butylamine.

16. The process as in claim 15, wherein the dimethylcarbamate formed is quaternized with methyl bromide to form the dimethylcarbamate of (3-hydroxy-2-pyridylmethyl) methyl-di-n-butylammonium bromide.

JOHN A. AESCHLIMANN.
ARTHUR STEMPEL.

REFERENCES CITED

The following references are of record in the file of this patent:

Sidgwick, Organic Chemistry of Nitrogen (1942 edition, p. 522.

Davies et al., J. Chem. Soc., 1947, 191–196.

Hartman, California & Western Medicine, 66 (No. 4), 242–248 (1947).